United States Patent
Baker et al.

[11] Patent Number: 6,017,602
[45] Date of Patent: *Jan. 25, 2000

[54] TRAFFIC BARREL HAVING A DOUBLE-WALLED CORRUGATED CONSTRUCTION

[76] Inventors: Stephen W. Baker, 115 Edgewood Ct.; Douglas A. Baker, #4 Southern View Acres, both of Auburn, Ill. 62615

[*] Notice: This patent is subject to a terminal disclaimer.

[21] Appl. No.: 08/947,131

[22] Filed: Oct. 8, 1997

Related U.S. Application Data

[62] Division of application No. 08/522,747, Sep. 1, 1995, Pat. No. 5,753,347.

[51] Int. Cl.$^7$ ............................. B29D 22/00; E01F 13/00
[52] U.S. Cl. ...................... 428/36.9; 428/182; 428/183; 428/215; 404/6; 404/10; 116/63 P
[58] Field of Search ........................ 428/182, 184, 428/213, 183, 36.9, 152, 174, 215; 404/6, 10; 116/63 P

[56] References Cited

U.S. PATENT DOCUMENTS

| | | | |
|---|---|---|---|
| D. 263,454 | 3/1982 | Leung | D10/109 |
| 416,288 | 7/1979 | Cobbs, Jr. et al. | 425/202 |
| 4,439,130 | 3/1984 | Dickhart et al. | 404/10 |
| 4,913,473 | 4/1990 | Bonnema et al. | 285/423 |
| 4,969,670 | 11/1990 | Bonnema et al. | 285/319 |
| 4,991,999 | 2/1991 | Helms | 405/151 |
| 5,032,072 | 7/1991 | Heuschkei | 425/150 |
| 5,106,554 | 4/1992 | Drews | 264/112 |
| 5,176,861 | 1/1993 | Ishikawa | 264/111 |
| 5,201,599 | 4/1993 | Kulp et al. | 404/6 |
| 5,219,241 | 6/1993 | Picton | 404/6 |
| 5,225,137 | 7/1993 | Sadr | 264/349 |
| 5,351,850 | 10/1994 | Brieskorn | 220/466 |
| 5,753,347 | 5/1998 | Baker | 428/182 |

*Primary Examiner*—Donald Loney
*Attorney, Agent, or Firm*—Haverstock, Garrett & Roberts

[57] ABSTRACT

A device for use as a meter pit or a traffic barrel, having double-walled construction in which one wall is a substantially smooth inner wall and a second outer wall is a corrugated wall, wherein the corrugated wall may be a singular wall extending from one end of the inner wall to the other end of the inner wall or a plurality of exterior walls attached sequentially at various points to the inner wall, the exterior corrugated walls may be linked to one another by a series of smooth walls. The corrugated wall has small, individual corrugations with the individual corrugations including a pair of trough walls and a crest, the small size of the individual corrugations making the device light-weight and impact resistant. The drum device is extruded and contains a polyolefin mixture, which preferably contains recycled and virgin polyethylene materials.

8 Claims, 4 Drawing Sheets

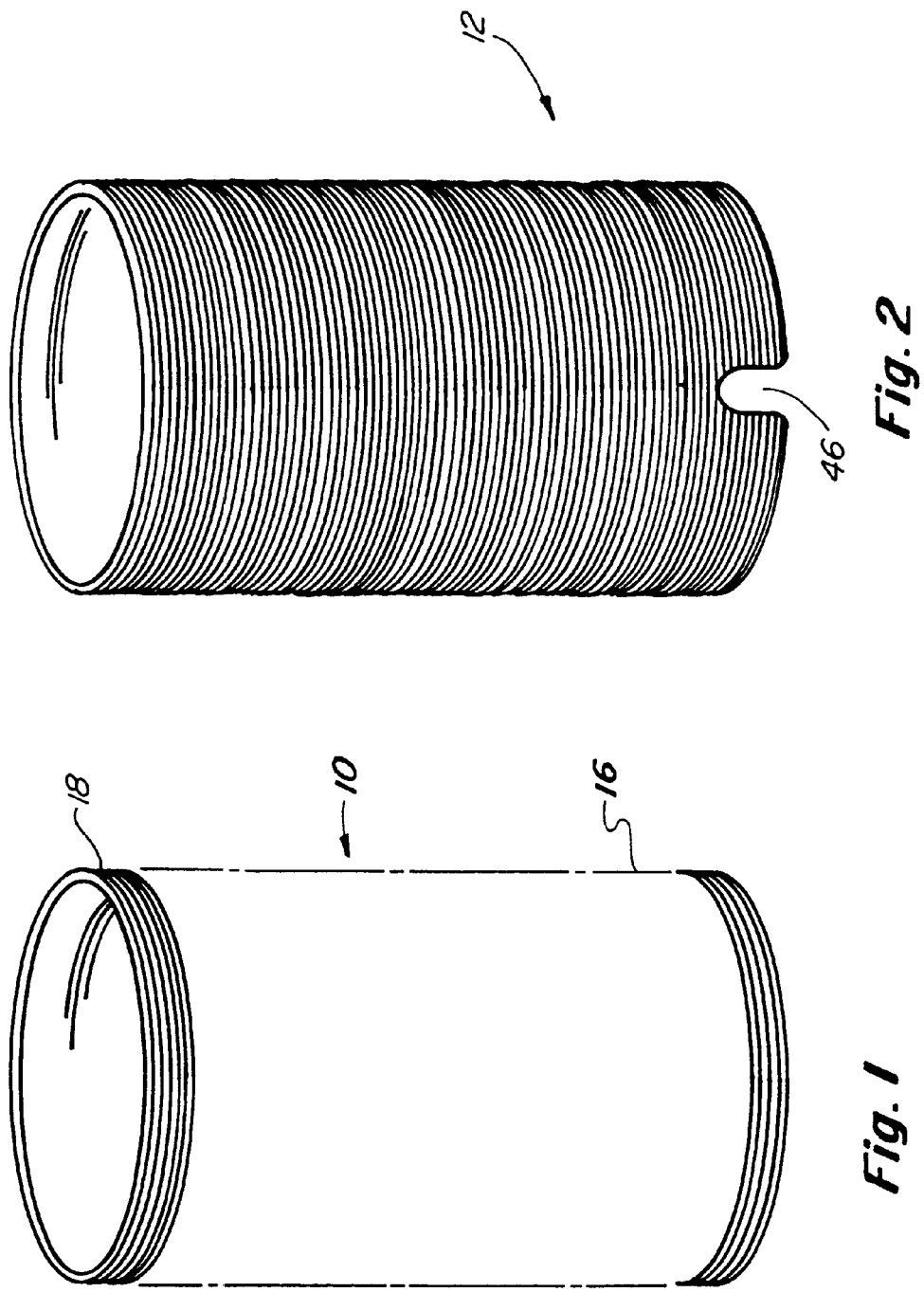

TRAFFIC BARREL HAVING A DOUBLE-WALLED CORRUGATED CONSTRUCTION

This is a divisional of application Ser. No. 08/522,747 filed on Sep. 1, 1995 now U.S. Pat. No. 5,753,347.

The present invention relates to the manufacture of improved devices such as meter pits and traffic barrels. The devices include a double wall construction that is comprised of an inner wall and a corrugated wall, with the corrugated wall and the inner wall bonded to one another. Both walls are made from a thermoplastic polymer blend, with the preferred thermoplastic compositions being polyolefins such as polyethylene, which may include a substantial portion of recycled polymeric material. The present device is advantageous as it is light-weight and impact resistant.

BACKGROUND OF THE INVENTION

The idea of having a device that may be used as a drum or barrel with a double-wall construction, and which includes a corrugated wall is known. It is further known to use a thermoplastic to form the drum or barrel construction. Some of the known prior art constructions are disadvantageous, however, as they are designed for use in industrial pipes where the wall constructions are quite thick resulting in a heavy, hard to handle device. Other known prior art constructions have a single wall construction which lacks impact resistance. Thus, a large amount of material must be used in the single wall construction to impart sufficient impact resistance. Furthermore, some prior art constructions have large corrugations with a large amount of space between the corrugations resulting in a decreased strength to weight ratio, which results in poor impact strength. Thus, the prior art constructions suffer from either using too much material resulting in an expensive construction that is too heavy or a lesser amount of material that results in a product that does not have suitable impact resistance. None of the prior art constructions, however, are adequately suited for use as either a meter pit or a traffic barrel, as such constructions require a design that is lightweight and impact resistant.

Prior art traffic barrels have typically had single-wall constructions, which resulted in the barrels being heavy and expensive, as well as, most importantly, lacking in impact resistance. For a single wall construction to have acceptable impact strength more material must be used, thus costs are increased. A single wall construction is typically not as impact resistant as a double wall construction of the same weight, and thus the single wall traffic barrels are disadvantageous as they are frequently impacted by automobiles. The impact of the automobiles will generally damage or destroy the traffic barrels. Because the single wall constructions are readily destroyed by automobiles, construction companies have to replace the traffic barrels more often, thereby increasing their cost. The present device overcomes the aforementioned problems by using a double-wall construction of tightly formed corrugations, which is advantageous in a traffic barrel construction as the double wall construction of the present device is lightweight and impact resistant.

Previously known meter pits have also suffered from impact resistance problems. Typically, when meter pits are distributed at a work site, they are thrown off the back of a truck resulting in frequent cracking and breaking of the meter pits. Consequently, it is desirable to have a meter pit with high impact resistance. In addition to high impact resistance, it is preferred that the meter pits be lightweight so that it is easier to place them in the ground as well as throw them off a truck. Thus, the present device, with its tightly formed corrugations is advantageous in the formation of meter pits because of its high impact resistance and lightweight construction.

In addition to a single wall construction, some prior art constructions are made of polyvinylchloride. The use of polyvinylchloride is disadvantageous, however, because the impact resistance of polyvinylchloride decreases when the polyvinylchloride is subjected to cold temperatures. Consequently, polyvinylchloride is unsuitable for use in cold weather settings either as a meter pit or a traffic barrel. The present device, however, is made of either polyolefins or copolymers of polyolefins, which are well suited for use in the cold weather.

SUMMARY OF THE INVENTION

The present invention resides in a device that may be used in a traffic barrel or meter pit construction, which is lightweight and has a high strength to weight ratio. The present device is made of a thermoplastic composition and includes an inner wall attached to at least one corrugated wall, with the corrugated wall construction having a plurality of narrow corrugations. The corrugated wall is advantageous as it imparts to the present device an unexpectedly high strength to weight ratio with a lightweight construction. The inclusion of narrow corrugations in the corrugated wall is important to the present device as the narrow corrugations are an integral factor in imparting the unexpected high strength to weight ratio of the present device. Also, because the individual corrugations of the corrugated wall are small they are relatively light weight and contain very little material. It is preferred for the inner wall to be smooth on both sides, with the corrugated wall and the inner wall bonded to one another.

The present device may be made from a polymer blend which includes polyolefins and copolymers of polyolefins. A variety of polyolefins and copolymers of polyolefins may be used, however, the preferred composition, is a blend of recycled and virgin polyethylene. The polyethylene is desirable because it maintains impact resistance in cold temperatures, and imparts excellent weight and strength characteristics to the present device.

The present device is typically formed in an extrusion process, with the device extruded at varying rates according to the production needs of the user. Regardless of the rate of extrusion, the extrusion process is advantageous as both meter pits and traffic barrels may be extruded as part of the same process, resulting in the production of the two devices during the same time period. A corrugator, that has a continuous mold train with multiple molds mounted thereon, is used to form a number of the devices with the preferred devices being either the traffic barrels and/or the meter pits. Thus, in production, dependent on the molds used, as the molds make a rotation a desired number of traffic barrels and/or meter pits may be produced.

BRIEF DESCRIPTION OF THE DRAWINGS

FIG. 1 is a perspective view of the present device with corrugations located on the top portion and the bottom portion of the present device;

FIG. 2 is a perspective view of the meter pit device showing the corrugations;

DETAILED DESCRIPTION OF THE PREFERRED EMBODIMENT

Figure 3:
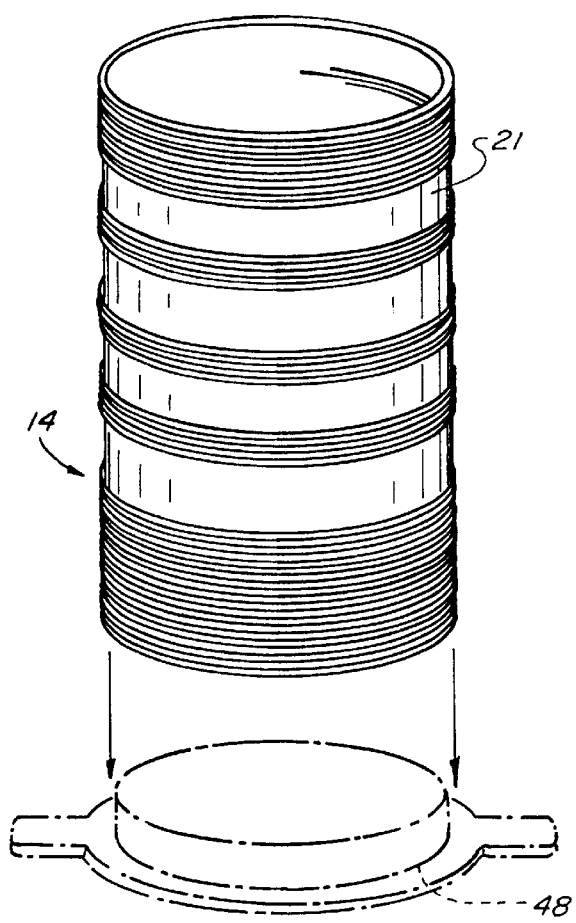
FIG. 3 is a perspective view of the traffic barrel being placed onto a traffic barrel hat.
Figure 4:
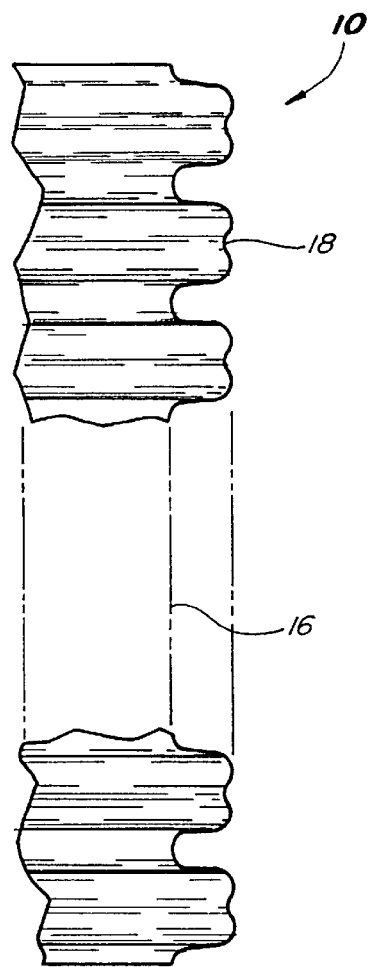
FIG. 4 is an exploded side view of the individual corrugations and the inner wall.
Figure 5:
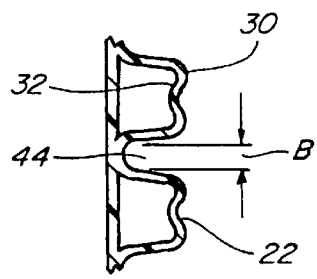
FIG. 5 is a side view of the inner wall bonded to a pair of corrugations showing the width of the groove.
Figure 6:
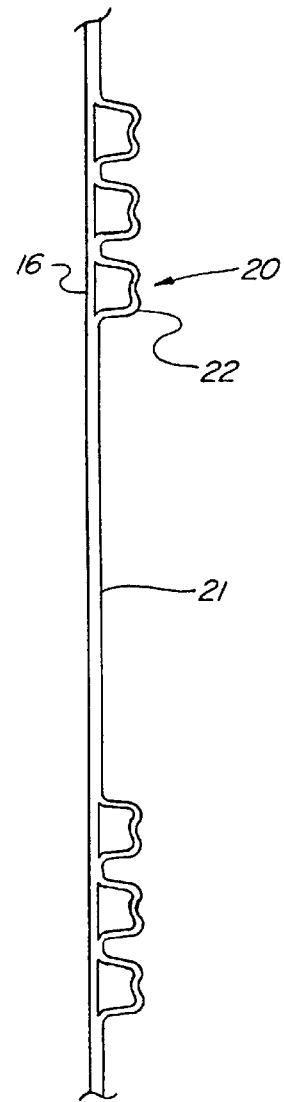
FIG. 6 is a side view of the traffic barrel with the inner wall bonded to a pair of corrugated walls.

Referring to the drawings more particularly by reference numbers, number 10 shown in FIG. 1, refers to a device constructed according to the teachings of the present invention. The device 10 provides the user with a light-weight construction having a high strength to weight ratio, which allows the device to be used in a number of functional applications. Included among the applications for the device are a meter pit 12 shown in FIG. 2 and a highway barrel barricade 14 shown in FIG. 3. Regardless of the application, the device 10 has a double wall construction comprised of an inner wall 16 and a corrugated wall 18, as shown in FIGS. 1 and 4, with the inner wall 16 and the corrugated wall 18 attached or bonded to one another, as shown in FIGS. 5 and 6. Preferably, the device 10 is made of a polyolefin or a copolymer of a polyolefin, which also, preferably, contains a blend of recycled and virgin materials.

The inner wall 16 is typically a cylindrical tube that may be used to form the interior portion of the device 10. The inner wall 16 has an interior inner wall 17 and an exterior inner wall 19, with the preferred construction having a smooth wall surface on both the exterior and interior inner wall. The inner wall 16, however, may also have a slightly rough or slightly corrugated construction on both the interior inner wall 17 and the exterior inner wall 19. Thus, the inner wall 16 may have a variety of constructions as long as an adequate bond can be formed between the corrugated wall 18 and the inner wall. Typically, the inner wall 16 forms the interior portion of the device 10, with the inner wall having a height which ranges between about 5 inches and about 100 feet, with the preferred construction having a height of approximately 36 inches. The height of the inner wall may vary substantially, because the inner wall may be continually extruded until the user elects to cut the inner wall to a desired height. Thus, the height of the inner wall may be limited only by the amount of the material available. The height of the inner wall 16 is dependent upon the final device or desired use of the inner wall. The diameter of the inner wall 16 may range between about 10 inches and about 4 feet, with the inner wall having a preferred diameter of approximately 18.50 inches, however, the dimensions of the inner wall may again vary according to the final use. Furthermore, the inner wall 16 will have a width measured from the inner radius or interior inner wall 17 to the outer radius or exterior inner wall 19 of between about 0.025 inches and about 0.5 inches, with the preferred width being approximately 0.050 inches. The dimensions of the inner wall 16 are desirable as they allow the device 10 to be light-weight and durable, yet strong enough for use in a meter pit 12 or a traffic barrel 14. Also, the construction of the inner wall 16 contributes to the device 10 having a high strength to weight ratio, thereby allowing the device to withstand substantial impact without breaking or cracking. Construction of the inner wall may be altered to conform to the needs of a desired use, thus the height, width, and circumference may be changed. Regardless of how the dimensions are altered, the inner wall must still be capable of bonding to the corrugated wall 18. Further, while it is preferred that the inner wall 16 be cylindrical, the inner wall may be of any other shape as long as it can adequately withstand substantial impact without breaking or cracking.

Figure 7:
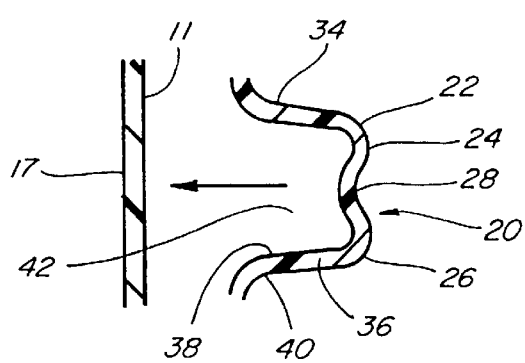
FIG. 7 is a side view of the inner wall and an individual corrugation.

As mentioned, the present device 10 includes a corrugated wall 18 bonded to the inner wall 16. Like the inner wall 16, the preferred shape of the corrugated wall 18 is a substantially cylindrical tube, which allows the corrugated wall to fit around and bond to the cylindrical inner wall. Furthermore, more than one corrugated wall 18 may be bonded in series to the inner wall 16, as shown in FIG. 3, or a singular corrugated wall may be bonded to the inner wall, as shown in FIG. 2. The corrugated walls are bonded in series to the inner wall and may be linked to one another by a group of smooth walls 21, also bonded in series to the inner wall, with the smooth walls connected to the corrugated walls. The smooth walls 21 and corrugated walls are integrally connected to one another to form a singular wall, as shown in FIG. 6. It is preferred for the corrugated walls to be bonded to the inner wall, with the corrugated walls integrally linked to one another by the smooth walls 21, however, more than one corrugated wall may be extruded without the integrally attached smooth walls. Thus, the device 10 may have a single wall construction at points where the corrugated walls are not bonded to the inner wall. Typically, each corrugated wall 18 will have a plurality of annular corrugations as shown in FIGS. 1, 2, and 5, with the height of the corrugated wall ranging from about 0.25 inches to a height equal to that of the inner wall 16. While the corrugated wall may have only one corrugation it is preferred for the corrugated wall 18 to have a plurality of annular corrugations, as shown in FIGS. 1 through 6, with an individual corrugation 20 shown in FIGS. 7 and 11.

Figure 11:
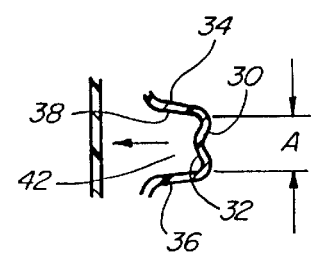
FIG. 11 is a side view of the inner wall and an individual corrugation showing the distance between the trough walls.

Each individual annular corrugation 20 has a double ribbed crest 22, with the crest having a pair of crest points 24 and 26 and a crest depression 28. The crest design is advantageous as it imparts additional strength and impact resistance to the overall construction of the device 10. The crest 22 further has an exterior crest portion 30 and an interior crest portion 32, as shown in FIG. 5. A pair of trough walls 34 and 36, each having an interior portion 38 and an exterior portion 40 are integrally attached to the crest 22 to form a U-shaped object with an interior space 42. The trough walls 34 and 36 along with the crest 22 form an individual corrugation 20. The trough walls of the individual corrugations are integrally attached to one another, opposite the respective crests 22, to form an annular groove 44, as shown in FIGS. 5 and 6. The corrugated wall 18 may have a plurality of grooves dependent upon the number of individual corrugations. Additionally, the preferred dimensions of each individual corrugation 20, are a troughwall thickness measured from the interior portion 38 of the individual trough wall to the exterior portion 40 of the individual trough wall of from about 0.040 inches to about 0.080 inches, with the preferred trough wall thickness being approximately 0.060 inches. The crest 22 has a thickness measured from the exterior crest portion 30 to the interior crest portion 32 that ranges from about 0.020 inches to about 0.060 inches, with the preferred crest thickness being approximately 0.040 inches. Also, when the corrugated wall 18 and the inner wall 16 are bonded to one another, the distance from the interior crest portion 32 to the exterior inner wall 19 is between about 0.20 inches and about 1 inch, with the preferred distance being approximately 0.340 inches. The distance between the interior portion 38 of the trough walls 34 and 36 of an individual corrugation 20, where the trough walls meet the crest 22, is the distance between the trough walls 34 and 36 identified by the letter A and is shown in FIG. 11. The distance measured by A is between about 0.20 inches and about 0.80 inches, with the preferred distance being approximately 0.410 inches. The width of the groove 44 is the distance between the exterior portion 40 of the adjacent trough walls of the two individual corrugations and is the distance between trough walls 34 and 36 identified by the letter B, as shown in FIG. 5. The width of the groove 44 ranges between about 0.05 inches to about 0.50 inches, with the preferred width being approximately 0.160 inches. Furthermore, the corrugated wall 18 will have a pitch of from about 0.25 inches to about 1.5 inches, with the preferred pitch being approximately 0.65 inches. The pitch is equal to the number of corrugations divided by a lineal foot. Thus, the corrugated wall 18 of the present device 10 has small corrugations, which contribute to the present device's light-weight and impact resistant characteristics, and increase the strength to weight ratio of the device 10.

The corrugated wall 18 and the inner wall 16 are bonded to one another during an extrusion process, whereby an integral bond is heat formed between the two walls, as shown in FIGS. 5 and 6. Generally, the corrugated wall 18 is extruded first and the inner wall 16 is extruded thereafter, with the corrugated wall heat bonding to the inner wall. The bond is formed by having the inner wall 16 melt onto the corrugated wall 18, and the corrugated wall slightly melting from contact with the hot inner wall to form an integral bond. Forming a bond by having the walls melt together is preferred, however, glue and other means of attachment may be used. The integral bond is quite strong, which allows the two walls to function as a singular unit, thereby creating an unexpected strength to weight ratio. Thus, the corrugated wall 18 when combined with the inner wall 16 provides the device 10 with an increased strength to weight ratio. Also, when the corrugated wall is extruded, a corrugated wall equal in height to the inner wall may be extruded or a plurality of individual corrugated walls combined in series with the inner wall may be extruded, with the corrugated walls either integrally attached to one another by a smooth wall 21 or separate from one another. Regardless, at least one corrugated wall is extruded onto the inner wall.

Any of a variety of polyolefins and copolymers of polyolefins may be used in the present device. Specific polyolefins that may be used include polypropylene, polybutylene, and polyethylene. Polyethylene compositions, particularly high density polyethylene compositions, are the preferred materials used in the present device 10. Other polyolefins and copolymers of polyolefins, however, may be used as long as they impart high impact resistance and are economically feasible to use in the manufacture of the present device 10. The polyethylene compositions are preferred because of their characteristics of high strength, broad temperature tolerance, low cost, and ease of extrusion. Also, the polyolefin compositions may have a foaming agent added to increase the light-weight characteristics of device 10.

When manufacturing the present device 10, it is preferred to use a combination of recycled and virgin polyethylene. The combination of recycled and virgin polyethylene may be combined such that the recycled polyethylene may be added in an amount equal to from about 1% of the total weight of the polyethylene mixture to about 100% of the total weight of the polyethylene mixture. Also, color concentrates with U.V. stabilizers, such as benzotriazoles, hindered amine light stabilizers, and benzophenones, may be added to protect the device 10 from degradation due to sunlight. The preferred combination of recycled and virgin polyethylene comprises a mixture having recycled polyethylene added in an amount equaling about 25% of the total weight of the mixture, virgin polyethylene added in an amount equaling about 70% of the total weight of the mixture, and white color concentrates added in an amount equal to about 5% of the total weight of the mixture.

Extrusion is the preferred method of formation of the present device. Other methods, however, may be used to form the present device 10 such as blow molding, injection molding, and singular extrusion. The system presently used to manufacture the device 10 includes a Davis Standard Extruder Model 450 and a Corma Corrugator Model 1520 corrugator which is manufactured and sold by Corma, Inc. Any extruder or corrugator, however, may be used as long as it is capable of forming the present device 10. The Corma corrugator includes an oval shaped mold train, with a plurality of molds mounted thereon. Each rotation of the mold train is designed to preferably manufacture seven meter pits and one traffic barrel per rotation of the mold train, with the traffic barrel 14 and the meter pits 12 having a double wall design which includes the corrugated wall 18 of the present device. While it is preferable to manufacture seven meter pits and one traffic barrel, the molds may be altered to manufacture only meter pits or only traffic barrels, or a plurality of both devices. The entire production system is capable of extruding the device at a rate of from about 1 foot/minute to about 10 feet/minute, with the device weighing approximately 3 lbs./ft. The rate of production may be altered to adjust to the desired dimensions and characteristics of the device 10.

Figure 8:
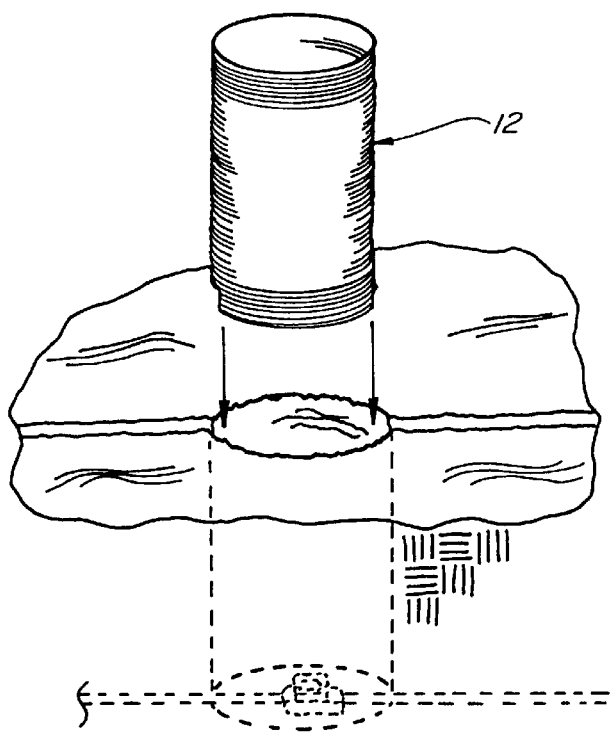
FIG. 8 is a top perspective view of the meter pit being placed in a hole with a meter line.
Figure 9:
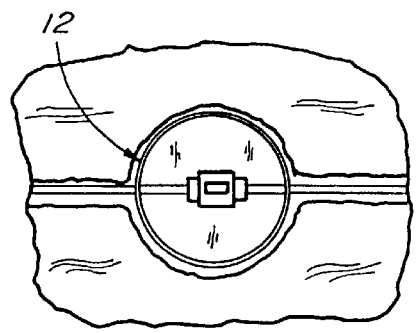
FIG. 9 is a top view of the meter pit placed over a meter line.

As mentioned previously, the preferred use of the device 10 involves meter pits 12 and traffic barrels 14. The meter pit 12 has a double wall construction with the inner wall 16 bonded to the corrugated wall 18 and the corrugated wall extending the length of the inner wall. The meter pit 12 also has a pair of opposed spaces 46 cut out of one end of the meter pit, thereby allowing the meter pit to fit over water pipes or other types of pipes associated with the use of the meter pit. The spaces 46 allow the meter pit to be snugly placed on a pipe located in the ground as shown in FIGS. 8 and 9.

Figure 10:
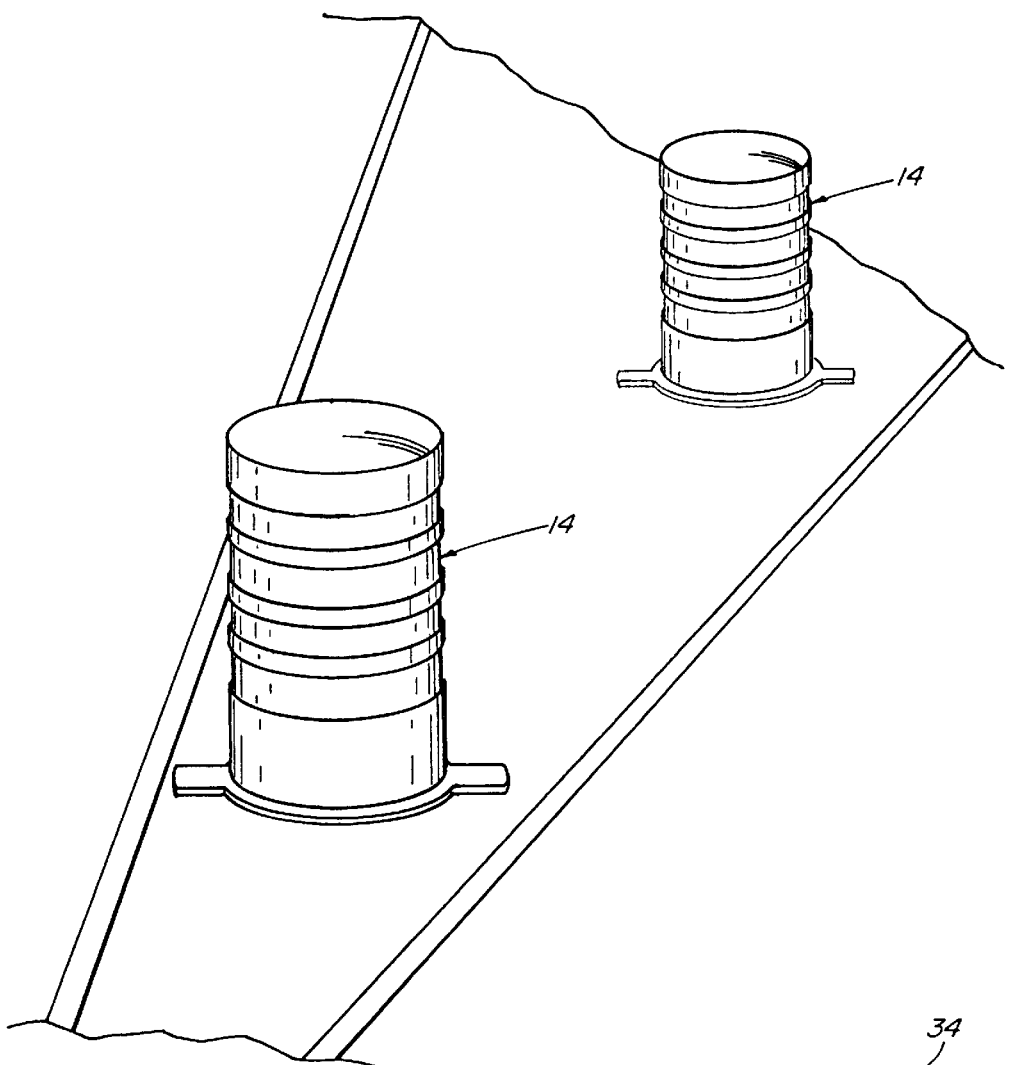
FIG. 10 is a functional perspective view of the traffic barrels.

Traffic barrels 14 are formed by the same process as the meter pits 12, however, the traffic barrels have a plurality of corrugated walls 18 attached in series to the inner wall 16, as shown in FIG. 3. The corrugated walls may be connected one another by a series of integral smooth walls 21 or separate from one another. In the preferred traffic barrel construction, five separate corrugated walls are integrally connected by smooth walls to form a unitary corrugated wall that is bonded to the inner wall 16 as shown in FIG. 3. The corrugated walls 18 on the traffic barrels are comprised of a plurality of corrugations, with the corrugated walls having from about two individual corrugations to about 20 individual corrugations. The height of the corrugated walls may range from about 0.25 inches to a height equal to the inner wall, with the preferred height of the corrugated wall ranging between about 2 inches and about 12 inches. The smooth wall 21 located between the corrugated walls is designed for placement of a commercial reflective tape so that the traffic barrel can be readily seen by motorists on a highway. Thus, the traffic barrel 14 may have multiple corrugated walls bonded to the inner wall 16. The traffic barrels are further designed to fit on traffic barrel hats 48, as shown in FIG. 3, with the corrugated walls imparting advantageous characteristics to the present device such as a light-weight construction and a high strength to weight ratio. The corrugated wall construction is particularly advantageous as it gives the traffic barrel 14 high impact resistance. The traffic barrels are shown in a functional position in FIG. 10.

EXAMPLE 1

The device of the present invention, which has a preferred use as a meter pit or a traffic drum, was formed by the use of a production line which included an extruder, a corrugator, a cooling tank, and an auxiliary haul off device. A combination of 25 pounds recycled high-density polyethylene was added to 70 pounds of virgin high-density polyethylene, produced by Quantum Chemical Company, along with 5 pounds of PE-620-UV white color concentrate pellets manufactured by Modem Dispersions Inc. The polyethylene materials were mechanically blended in a resin blender until the pellets were thoroughly mixed and then transferred to a storage hopper where the blended polyethylene materials were stored until the storage hopper was signaled to transfer the mixed polyethylene materials to a resin hopper located on the extruder. The storage hopper was connected to the resin blender and the resin hopper by a set of vacuum lines. The polyethylene material then exited the resin hopper by means of gravity, whereby the material was fed into an extruder barrel. The extruder barrel was approximately 11 feet long and had heaters attached to the outside of the barrel which maintained the temperature in a range between about 350° F. and about 400° F. An extruder screw was located inside the extruder barrel, with the extruder screw being slightly smaller in diameter than the extruder barrel and slightly longer than the extruder barrel. The extruder screw was manufactured from steel that was softer than the extruder barrel. As the extruder screw turned in the barrel, it pushed the polyethylene material through the barrel from one end to the other. The polyethylene material melted as it passed through the extruder barrel, so that by the time the material reached the end of the extruder barrel, it was in a melted state.

The end of the extruder barrel opposite where the polyethylene material entered was the extruder outlet and the extruder outlet had a screen pack changer attached thereto. The screen pack changer had screens of varying mesh sizes, including 30 mesh, 60 mesh, and 12×64 Dutch weave, with the screens designed to filter out any foreign matter which was present in the melted polyethylene stream. The screens were not all used at once, but were selected according to the level of contamination in the recycled polyethylene. The screen pack changer was important as it removed foreign matter and allowed for a clean polyethylene flow, thereby preventing the inclusion of contaminants within the extruded material. After the melted polyethylene material passed through the screen pack changer, the material flowed into a die which was a steel cylinder located inside a steel cylinder located inside a steel cylinder. The die had this type of design so that the two walls could be extruded. The steel cylinders created passageways that the polyethylene material flowed through. The die was heated so that the polyethylene material was maintained in a melted state. Connected to the end of the die was a caliper which tapered outward with the exit end being approximately the same size as the inside diameter of the inner wall of the completed device. Another caliper had an exit end that was also approximately the same size as the inside diameter of the corrugated wall. The melted polyethylene material passed through the calipers and flared out into a corrugator, with the corrugator having a top and a bottom continuous oval mold train, with molds attached thereto. The caliper for the corrugated wall was placed such that the corrugated wall was extruded first and the caliper for the inner wall was a distance of approximately 16.5 inches from the caliper for the corrugated wall, with the inner wall extruded thereafter. The corrugated wall cooled slightly allowing it to be in a hardened state when the inner wall was extruded onto the corrugated wall. The molds were mounted on a pair of continuos oval mold trains forming a top and a bottom, with the molds forming the desired shape of the extruded final object, either a meter pit or a traffic barrel. The mold trains moved in a horizontal direction and then turned 180 degrees and returned back to the polyethylene entry point, with the top mold train rotating counter-clockwise and the bottom mold train rotating clockwise. The mold trains held molds that formed seven meter pits and a traffic barrel per rotation of the mold train. As the hot polyethylene material passed into the molds, the polyethylene material was formed into the desired shape and passed through the mold system so that a continuous part was formed. As the part passed from the beginning of the corrugator to the end of the corrugator, the device cooled, so that by the end it was hardened. The hardened plastic part was then passed through a water tank to complete the cooling process, and upon passing through the water tank, the devices were cut to the desired length by a saw, thereby forming the finished device.

EXAMPLE 2

One thousand four-hundred and seventy Meter pits and two-hundred and ten traffic barrels are formed according to the process disclosed in Example 1, wherein 3780 pounds of recycled high density polyethylene material is combined with 10584 pounds of virgin high density polyethylene resin and 756 pounds of color concentrate. The polyethylene compositions are melted according to the process disclosed in Example 1 and mixed to form a homogenous composition. The composition is then extruded, as in Example 1, by a Davis extruder model 450 and formed by a Corma corrugator model 1520 to form 1470 meter pits and 210 traffic barrels having dual wall constructions, wherein the interior wall is smooth and the exterior wall is corrugated. The meter pits and the traffic barrels are formed in a seven to 1 ratio over a 24 hour time period.

EXAMPLE 3

A pair of meter pits were formed according to the process disclosed in Example 1, with the meter pits being compared to other known prior art meter pits. The prior art commercial meter pits were from Hancor, Fratco, Contech, and Sonoloc, which are listed in the accompanying test results. The meter pits were tested for strength-to-weight ratio in a vertical load test, wherein a 12 inch horizontal sample of each meter pit was placed in a parallel plate testing machine, with the corrugations perpendicular to the direction of the load. The plates of the parallel plate testing machine were then brought together to vertically crush each individual meter pit, with the weight per foot measured to determine what the strength-to-weight ratio was for each meter pit. Thus, a load reading was taken at each maximum load point which was then used to formulate the strength-to-weight relationship, shown in the following table.

| TEST RESULTS | | | |
|---|---|---|---|
| | PEAK LOAD | WEIGHT PER FOOT | STRENGTH TO WEIGHT RATIO |
| POLYETHYLENE PITS | | | |
| SPI #1 | 3302 lbs. | 3.12 lbs. | 1058 lbs./lb. |
| SPI #2 | 4150 lbs. | 3.15 lbs. | 1317 lbs./lb. |
| Hancor #1 | 2500 lbs. | 6.36 lbs. | 393 lbs./lb. |
| Hancor #2 | 2670 lbs. | 6.44 lbs. | 414 lbs./lb. |
| Fratco #1 | 6740 lbs. | 7.42 lbs. | 908 lbs./lb. |
| Fratco #2 | 5690 lbs. | 7.16 lbs. | 795 lbs./lb. |
| POLYVINYL-CHLORIDE PITS | | | |
| Contech #1 | 27700 lbs. | 8.56 lbs. | 3199 lbs./lb. |
| Contech #2 | 24090 lbs. | 8.35 lbs. | 2885/lbs./lb . |
| Sonoloc #1 | 6012 lbs. | 3.95 lbs. | 1522 lbs./lb. |
| Sonoloc #2 | 3765 lbs. | 4.01 lbs. | 936 lbs./lb. |

As can be seen from the above data, the present device had superior strength-to-weight ratio characteristics, when compared to the other meter pits made of polyethylene. The present device's samples (SPI #1 & 2) had a strength to weight ratio of 1058 lbs./lb. and 1317 lbs/lb., which when compared to the Hancor and Fratco meter pits, also made of polyethylene, the present device had a superior strength to weight ratio.

EXAMPLE 4

Three Meter pits were again formed according to the process disclosed in Example 1, with the present meter pits being compared to other known prior art meter pits. The prior art meter pits being made by Hancor, Fratco, Sonoloc, and Contech. Four inch horizontal samples of each meter pit were taken and placed in a freezer having a temperature of −10° F., plus or minus 5° F. for a minimum of 30 minutes. Upon achieving the desired cooled temperature, the samples were removed from the freezer and subjected to a 12 pound tup. A tup is a conical weight having a blunt end. The tup was dropped from various heights, up to 72 inches, through a cylindrical tube onto the frozen meter pit. This test was used to determine at what point the frozen meter pit would fail. Failure was defined at the point where the tup penetrated the pipe.

| TEST RESULTS | | |
|---|---|---|
| | DROP HEIGHT AT FAILURE | IMPACT LOAD AT FAILURE |
| POLYETHYLENE PITS | | |
| SPI #1–#3 | At 72" Pit Had Not Failed | >72 ft. lbs. |
| Hancor #1–#3 | At 72" Pit Had Not Failed | >72 ft. lbs. |
| Fratco #–#3 | At 72" Pt Had Not Failed | >72 ft. lbs. |
| POLYVINYL-CHLORIDE PITS | | |
| Sonoloc #1 | 46" Pit Failed | 46 ft. lbs. |
| Sonoloc #2 | 50" Pit Failed | 50 ft. lbs. |
| Sonoloc #3 | 46" Pit Failed | 46 ft. lbs. |
| Contech #1 | 54" Pit Failed | 54 ft. lbs. |
| Contech #2 | 53" Pit Failed | 53 ft. lbs. |
| Contech #3 | 53" Pit Failed | 53 ft. lbs. |

As can be seen from the low temperature impact test, the present device, SPI#1–3, showed excellent impact resistance characteristics when frozen, as the present device was not penetrated by a tup dropped from as high as 72 inches. Of particular importance is the fact that the meter pits constructed from polyvinylchloride, the Sonoloc and Contech pits, failed to withstand substantial impact when frozen. As can be seen none of the polyvinylchloride meter pits could withstand an impact greater than 54 ft. lbs. Thus, it can be deduced that the meter pits constructed from polyvinylchloride are inadequate in cold or frozen conditions. Consequently, it is advantageous to use a traffic barrel or meter pit constructed from polyethylene.

It should be noted that other thermoplastic compositions besides polyolefins and copolymers of polyolefins may be used in the present device 10. Among the other thermoplastic compositions that may be used are polyamides, polystyrene, polycarbonate, polyurethane, polyvinylchloride, and other thermoplastics, including co-polymers.

Many changes, modifications, variations, and other uses and applications of the present device will, however, become apparent to those skilled in the art after considering this specification and the accompanying drawings. All such changes, modifications, variations, and other uses and applications which do not depart from the spirit and scope of the invention are deemed to be covered by the present invention, which is limited only by the claims which follow.

What is claimed is:

1. A traffic barrel having a plurality of corrugated walls bonded to an inner wall, with said corrugated walls integrally connected by smooth walls to form a unitary corrugated wall, with each of said corrugated walls having a plurality of corrugations comprised of a crest and a pair of trough walls, said crest having a thickness of from about 0.020 inches to about 0.060 inches and a distance from said inner wall of from about 0.20 inches to about 0.50 inches, said trough walls having a thickness of from about 0.040 inches to about 0.080 inches, and said trough walls of said individual corrugations forming grooves having a width ranging between about 0.05 inches and about 0.50 inches.

2. The traffic barrel of claim 1 wherein said corrugated wall has a pitch ranging from about 0.25 inches to about 1.5 inches.

3. The traffic barrel of claim 1 wherein the material used to make said device is selected from the group comprising polyolefins and copolymers of polyolefins.

4. The traffic barrel of claim 1 wherein the crest wall thickness is approximately 0.040 inches.

5. The traffic barrel of claim 1 wherein the crest distance from said inner wall is approximately 0.340 inches.

6. The traffic barrel of claim 1 wherein the trough wall thickness is approximately 0.060 inches.

7. The traffic barrel of claim 1 wherein the width of said groove is approximately is 0.160 inches.

8. The traffic barrel of claim 1 wherein said inner wall is bonded to said trough walls of said corrugated wall by a bond formed during an extrusion process, said bond being an integral bond formed between said trough walls of said corrugated wall and said inner wall.

* * * * *